Dec. 27, 1955
G. A. MARSH
2,728,727
METHOD AND COMPOSITION FOR INHIBITING CORROSION
Filed June 19, 1952
2 Sheets-Sheet 1
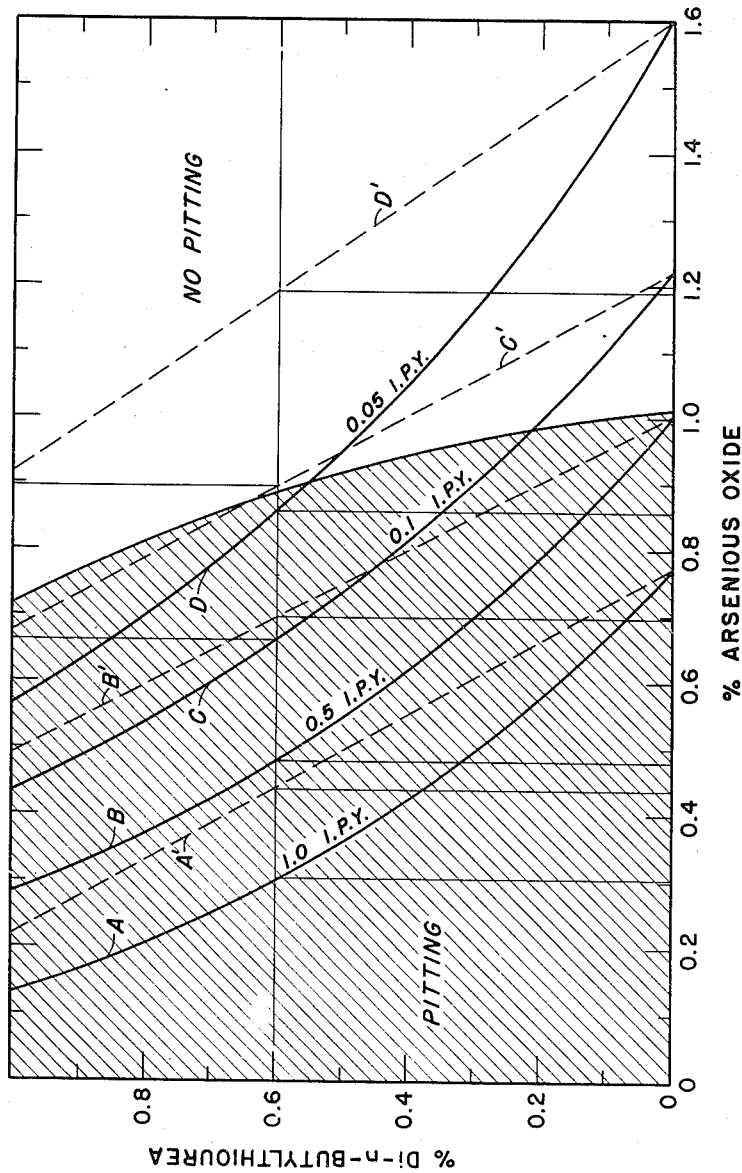
FIG. I
INHIBITION OF CORROSION OF STEEL IN 50%
Di-FP ACID AT 185° F.
INVENTOR.
GLENN A. MARSH
BY Edward H. Lang
ATTORNEY

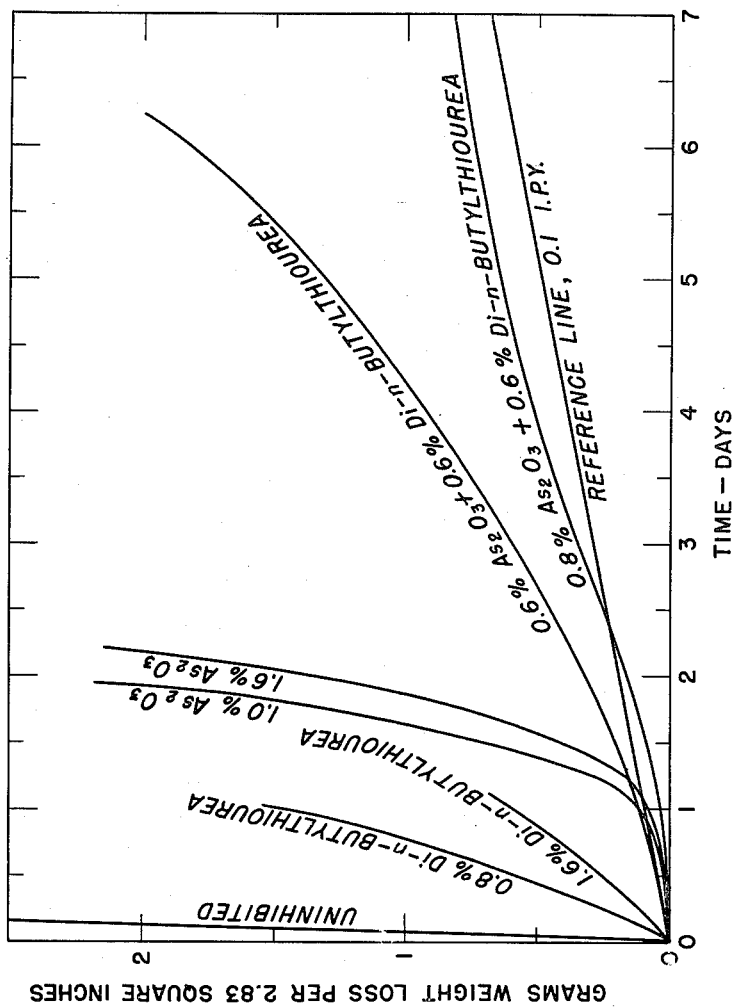

United States Patent Office 2,728,727
Patented Dec. 27, 1955
:::

2,728,727
METHOD AND COMPOSITION FOR INHIBITING CORROSION

Glenn A. Marsh, Crystal Lake, Ill., assignor to The Pure Oil Company, Chicago, Ill., a corporation of Ohio Application June 19, 1952, Serial No. 294,523

26 Claims. (Cl. 252—8.55)

The present invention relates to a method and composition for mitigating the corrosive action of hydrofluoric acid producing or containing solutions on metal surfaces and, more particularly, the invention provides a corrosion-inhibiting composition comprising the combination of an arsenic compound and an alkyl, aryl or alkyl, aryl thiourea compound.

It, therefore, becomes a primary object of this invention to provide a method and composition for inhibiting the corrosive action of acid solutions on metal surfaces.

Another object of this invention is to provide a composition and method for inhibiting the corrosion of metals by solutions producing or containing hydrofluoric acid.

Still another object of this invention is to provide a corrosion-inhibiting composition containing an arsenic compound and a thiourea compound which is more effective than either compound used alone and also more effective than the additive effects of the separate compounds.

Another object of this invention is to provide a method and composition for reducing the corrosion and/or pitting of metal surfaces, especially ferrous metal surfaces during contact with fluophosphoric acid solutions at elevated temperatures for extended periods of time.

Other objects and advantages will become apparent from the following description and drawings wherein:

Figure 1 represents graphically a comparison of the relative effectiveness of the present inhibitor combinations in reducing the corrosion and pitting of steel.

Figure 2 is a corrosion-time curve showing the enhanced results obtained with the present inhibitor combinations with increase in contact time.

Trivalent arsenic compounds, including the various arsenic salts and oxides including arsenious oxide, are known corrosion inhibitors capable of mitigating and reducing the deleterious effect of inorganic salt solutions and acid solutions on metal surfaces. Thiourea compounds and derivatives thereof are known to reduce the corrosive action of certain waste products containing ammoniacal or acid solutions of ammonium nitrates. Certain amino carboxylic acids, substituted phenols, organic nitrogen bases, alkyl amines, amino alcohols, and sulfur-containing compounds have been used for their ability to enhance the corrosion inhibiting properties of known corrosion inhibitors. Most of these inhibitors and their combinations are effective at ambient temperatures and only for comparatively short periods of time.

There are numerous industrial processes employing strong acid solutions under conditions wherein metal corrosion presents a serious problem. Some of these are the manufacture of superphosphate of calcium and other fertilizers, the manufacture of dye intermediates, petroleum refining, the production of various chemicals, coal products, iron and steel, paints, pigments, rayon, cellulose, explosives, textiles, bleaching agents, acid salts, fluorides, and processes like cleaning of stone, the etching of glass, and the treatment of oil wells. In these and related industrial processes the excessive corrosion and pitting of metal surfaces has for the most part gone unchecked, especially where strong acid solutions are employed at elevated temperatures for long periods of time.

The present invention depends on the discovery of a process and composition for inhibiting and materially reducing the corrosion rate of acid solutions on metal surfaces, especially the reduction of the corrosive action of hydrofluoric acid containing or producing solutions in processes where conditions are optimum for rapid corrosion, as where the time of contact is long and elevated temperatures are used.

It has been discovered that the combination of trivalent arsenic compounds and alkyl, aryl, or alkyl aryl thiourea compounds, especially arsenious oxide and di-n-butyl thiourea and diethyl thiourea, yields a corrosion inhibiting effect above and beyond either compound alone. Trivalent arsenic compounds and alkyl, aryl, or aryl alkyl substituted thioureas used alone are effective corrosion inhibitors where relatively mild corrosion conditions exist. In environments where the temperature, concentration, or contact time of the acid solution and metal are increased or other conditions are present which accelerate the rate of corrosion, these inhibitors alone lose their ability to offer adequate protection for the metal surfaces. However, when, as described herein, the trivalent arsenic compounds and the thiourea compounds are used together in these atmospheres which normally accelerate corrosion, their effectiveness is increased many fold. By the use of the combination of inhibitors herein, it becomes possible to reduce the rate of corrosion of acid solutions, especially hydrofluoric acid producing and containing solution, under relatively extreme conditions and without severe pitting. The extent of corrosion of metals is measured in terms of weight loss and by visual examination of the metal surface for the presence or absence of pitting. A certain uniform weight loss can be tolerated without extensive damage to the metal equipment during its normal useful life. However, that same weight loss if confined to small areas or pits may have a very deleterious effect upon the strength of the metal. The present invention provides the additional advantage of not only reducing the weight loss, but also mitigating the degree of pitting.

The combination of inhibitors of this invention and the processes described in connection therewith are applicable to acidic environments where conditions of corrosion and/or pitting of metal surfaces, in particular ferrous metal surfaces, are present. Although the invention also has application where relatively mild corrosion or pitting conditions exist, it is particularly applicable to those environments wherein relatively severe corrosion conditions exist. For example, the invention is useful in those processes above enumerated where metal parts and metal equipment are in contact with aqueous hydrofluoric acid containing or producing solutions under normal atmospheric and temperature conditions and is particularly effective where the conditions are extreme, that is, where the time of contact is extensive, and temperature and/or concentration are high.

Methods have been devised for handling hot acid solutions to protect the personnel, but very little has been done to stop the corrosion of the metal parts. Therefore, although the invention is applicable to the mitigation of metal corrosion due to the action of hydrofluoric acid generally, it will be described using acid solutions which are adapted for increasing the permeability of siliceous earth formations since the corrosion experienced there presents a peculiar problem in itself. However, the invention is not to be limited thereby.

In the acidization of earth formations, it is common practice to inject into the earth formation an acid solution designed to dissolve portions thereof and effect an increase in the permeability to fluids or allow increased flow of oil therefrom. Hydrochloric acid has been successfully used for treating limestone formations, but up to the present time only indifferent success has been attained in treating sandstone wells with hydrofluoric acid or hydrofluoric acid-forming substances, such as the so-called "mud-acid." A recent method which promises to offer success in treating sandstone wells is described in copending application, Serial Number 178,958, filed August 11, 1950, now abandoned, of which Donald C. Bond is the sole inventor. This process involves the use of fluophosphoric acids including mono-, di-, and hexa-fluophosphoric acids.

The use of the fluophosphoric acids in this manner provides an effective method of increasing the permeability of earth formations. However, under the conditions imposed the rate of metal corrosion and the degree of pitting are accelerated. Consequently, the present discovery is particularly applicable to such an acidizing process. Before explaining in more detail this and other applications to which this invention may be placed, the tests describing the enhanced inhibition will be outlined.

In order to demonstrate the present invention, a series of experiments were conducted, using 50 per cent aqueous di-fluophosphoric acid, an example of a hydrofluoric acid producing composition, at 185° F. and testing the inhibiting effect of various commercial inhibitors upon steel test pieces. The di-fluophosphoric acid is representative of the type of hydrofluoric acid-producing composition contemplated by this invention. Using the method to be described infra, thirteen commercial inhibitors were tested and found to have little or no inhibiting effect on the corrosion of steel. These tests were run in duplicate to insure against overlooking a suitable inhibitor. From these tests, three inhibitors were chosen, which showed some corrosion inhibiting properties. These were arsenious oxide and inhibitors numbers 1 and 2, and 3.

These inhibitors are soluble in anhydrous fluophosphoric acids to a point well beyond the extent necessary for the experimental determination of their effective corrosion inhibiting properties. However, the rate of solution is slow and agitation is necessary to thoroughly dissolve the inhibitor in the acid, especially the di-fluophosphoric acid used in the tests. It was found to be unsatisfactory to attempt to dissolve arsenious oxide and thiourea in the diluted acid because the dry inhibitor is not wet easily by the aqueous acid. Therefore, the desired amounts of arsenic and thiourea compounds are added to the anhydrous acid and dissolved therein prior to mixing the acid with water.

In conducting the experiments, the following apparatus and procedure were used. Steel test pieces measuring 1½" x 11/16" were cut from N-80 alloy steel oil well tubing. The pieces were drilled close to one end to permit suspension of the steel strip in the acid solution by means of a Teflon ribbon, and numbered for identification. The surface area of each strip was 2.83±0.02 square inches. The surfaces of the strips were uniformly prepared before testing in the di-fluophosphoric acid by light grinding to remove rough mill scale, taking care not to excessively work harden the surface. Following, the strips were pickled for 30 minutes in inhibited hydrochloric acid solution and then rinsed with water and acetone. Finally the strips were rubbed with steel wool until slightly polished and then rinsed in acetone, followed by thorough drying in a desiccator. After weighing, the strips were held in the desiccator until ready for the tests. In conducting the test, the strips were suspended in the acid solutions for a definite time, removed and reweighed. Where corrosion products were found to be adhering, these were removed by light rubbing with a cloth.

The test acid solutions were mixed in a standard one-pint polyethylene bottle and the inhibitor for each acid solution was weighed out and added to the empty bottle. The bottle was placed on a platform balance and 250 grams of anhydrous di-fluophosphoric acid were added with stirring to insure dissolution of the inhibitor. After the cautious addition of 250 grams of water, the acid solutions were allowed to stand overnight. Before conducting each test, the bottles were agitated again. After a steel strip had been properly suspended in the acid solution by means of a Teflon string, each bottle was placed in a water bath maintained at 185°±3° F. After completion of each test period, each strip was removed from the acid, washed, dried, and weighed. The corrosion penetration rate was calculated from the relationship (for steel) that 1 gram weight loss per 2.83 square inches per day is equivalent to 1 inch penetration per year (I. P. Y.). The results of these tests are shown in Table I.

*Table I*

| Exp. No. | Corrosion Inhibitor, wt. percent | | | Test Duration, hours | Corrosion Rate, I. P. Y. | Remarks |
|---|---|---|---|---|---|---|
| | $As_2O_3$ | #1 | #2 | | | |
| 1 | | | | 24 | >24 | Test pieces dissolved. |
| 2 | 0.5 | | | 24 | [1] 2.9 | Severe pitting. |
| 3 | 1.0 | | | 24 | [1] 0.22 | Some pitting. |
| 4 | 1.3 | | | 24 | [1] 0.06 | No pitting. |
| 5 | 1.6 | | | 24 | [1] 0.06 | Do. |
| 6 | 1.0 | | | 48 | [1] 2.8 | Severe pitting. |
| 7 | 1.3 | | | 48 | [1] 0.95 | Do. |
| 8 | 1.6 | | | 48 | [1] 0.81 | Do. |
| 9 | 1.6 | | | 72 | 1.5 | Do. |
| 10 | 1.6 | | | 168 | 3.5 | Do. |
| 11 | | 0.8 | | 24 | [1] 1.5 | Some pitting. |
| 12 | | 1.6 | | 24 | 0.6 | Slight pitting. |
| 13 | | | 1.0 | 24 | [1] 1.25 | Some pitting. |

[1] Figure indicates an average value determined by two or more independent determinations.

In Table I, corrosion inhibitors #1 and #2 are di-n-butyl thiourea. Both samples were obtained from a reputable chemical manufacturer. Di-n-butyl thiourea (#2) was an experimental sample, while di-n-butyl thiourea (#1) was from a recent full scale production of the product. No apparent difference between the two samples was detected upon ascertaining their physical properties, i. e., melting point. However, as will be observed, there was a difference in their ability to inhibit corrosion, which difference may be due to impurities or differences in processing technique by the manufacturer.

From Table I, it is shown that test pieces dissolved in di-fluophosphoric acid without the presence of an inhibitor and that each of the inhibitors is effective in reducing the corrosion rate to a certain extent.

In order to demonstrate the unusual effect of the combination of inhibitors of the present invention, a further series of experiments were conducted in which various combinations of arsenious oxide with inhibitors #1 and #2, just mentioned, were tested. The experiments include inhibitor Number 3, which is diethylthiourea.

Table II, following, shows that inhibitor Number 1 in combination with arsenious oxide was very effective in reducing the corrosion rate. The sample of di-n-butyl thiourea not only reduced the degree of pitting, but abetted the ability of the arsenious oxide to reduce the corrosion rate to an extent below that of either compound used alone. Compare experiments 24–32 with the experiments of Table I. This tendency to reduce pitting is less under long periods of contact as evidenced by experiments 33–38, but the combination of arsenious oxide and inhibitor Number 1 (di-n-butyl thiourea) was much more effective than the other combinations or any one inhibitor alone, in reducing the corrosion rate over extended periods of time. This is significant since many industrial acid-treating operations require days and even weeks of soaking or contact treatment wherein metal surfaces are in contact with acid solutions.

Table II

| Exp. No. | Corrosion Inhibitor, Wt. Percent | | | | | Test Duration, hours | Corrosion Rate, I.P.Y. | Remarks |
|---|---|---|---|---|---|---|---|---|
| | As₂O₃ | #1 | #2 | #3 | Total | | | |
| 14 | 0.2 | 0.2 | | | 0.4 | 24 | 3.5 | Severe pitting. |
| 15 | 0.2 | 0.4 | | | 0.6 | 24 | 2.2 | Do. |
| 16 | 0.2 | 0.6 | | | 0.8 | 24 | 0.7 | Do. |
| 17 | 0.2 | 0.8 | | | 1.0 | 24 | 0.2 | Some pitting. |
| 18 | 0.4 | 0.2 | | | 0.6 | 24 | 1.6 | Severe pitting. |
| 19 | 0.4 | 0.4 | | | 0.8 | 24 | 0.3 | Some pitting. |
| 20 | 0.4 | 0.6 | | | 1.0 | 24 | 0.5 | Do. |
| 21 | 0.4 | 0.8 | | | 1.2 | 24 | 0.3 | Do. |
| 22 | 0.6 | 0.2 | | | 0.8 | 24 | 0.6 | Severe pitting. |
| 23 | 0.6 | 0.4 | | | 1.0 | 24 | 0.4 | Do. |
| 24 | 0.6 | 0.6 | | | 1.2 | 24 | ¹ 0.08 | No pitting. |
| 25 | 0.6 | 0.8 | | | 1.4 | 24 | ¹ 0.04 | Do. |
| 26 | 0.8 | 0.2 | | | 1.0 | 24 | 0.2 | Do. |
| 27 | 0.8 | 0.4 | | | 1.2 | 24 | 0.1 | Slight pitting. |
| 28 | 0.8 | 0.6 | | | 1.4 | 24 | ¹ 0.07 | No pitting. |
| 29 | 0.8 | 0.8 | | | 1.6 | 24 | 0.1 | Slight pitting. |
| 30 | 1.0 | 0.5 | | | 1.5 | 24 | 0.18 | No pitting. |
| 31 | 1.3 | 0.5 | | | 1.8 | 24 | 0.16 | Do. |
| 32 | 1.3 | 0.5 | | | 1.8 | 24 | 0.09 | Do. |
| 33 | 0.6 | 0.6 | | | 1.2 | 96 | ¹ 0.21 | Severe pitting. |
| 34 | 0.6 | 0.8 | | | 1.4 | 96 | ¹ 0.19 | Do. |
| 35 | 0.8 | 0.6 | | | 1.4 | 96 | ¹ 0.12 | Some pitting. |
| 36 | 0.6 | 0.6 | | | 1.2 | 144 | ¹ 0.30 | Severe pitting. |
| 37 | 0.6 | 0.8 | | | 1.4 | 144 | ¹ 0.20 | Do. |
| 38 | 0.8 | 0.6 | | | 1.4 | 144 | ¹ 0.13 | Some pitting. |
| 39 | 0.1 | | 0.3 | | 0.4 | 24 | 2.4 | Severe pitting. |
| 40 | 0.1 | | 0.5 | | 0.6 | 24 | 1.5 | No pitting. |
| 41 | 0.1 | | 0.7 | | 0.8 | 24 | 1.2 | Do. |
| 42 | 0.3 | | 0.1 | | 0.4 | 24 | 7.6 | Severe pitting. |
| 43 | 0.5 | | 0.1 | | 0.6 | 24 | 5.3 | Do. |
| 44 | 1.0 | | 0.1 | | 1.1 | 24 | 1.0 | Do. |
| 45 | 0.2 | | | 0.2 | 0.4 | 24 | 9.7 | Do. |
| 46 | 0.2 | | | 0.4 | 0.6 | 24 | 2.6 | Do. |
| 47 | 0.2 | | | 0.6 | 0.8 | 24 | 3.6 | Do. |
| 48 | 0.2 | | | 0.9 | 1.0 | 24 | 3.5 | Do. |
| 49 | 0.4 | | | 0.2 | 0.6 | 24 | 2.2 | Do. |
| 50 | 0.4 | | | 0.4 | 0.8 | 24 | 1.4 | Do. |
| 51 | 0.4 | | | 0.6 | 1.0 | 24 | 1.4 | Do. |
| 52 | 0.4 | | | 0.8 | 1.2 | 24 | 1.5 | Do. |
| 53 | 0.6 | | | 0.2 | 0.8 | 24 | 1.1 | Do. |
| 54 | 0.6 | | | 0.4 | 1.0 | 24 | 1.6 | Do. |
| 55 | 0.6 | | | 0.6 | 1.2 | 24 | 1.0 | Do. |
| 56 | 0.6 | | | 0.8 | 1.4 | 24 | 1.4 | Do. |
| 57 | 0.8 | | | 0.2 | 1.0 | 24 | 0.3 | Do. |
| 58 | 0.8 | | | 0.4 | 1.2 | 24 | 0.1 | Do. |
| 59 | 0.8 | | | 0.6 | 1.4 | 24 | ¹ 0.2 | Do. |
| 60 | 0.8 | | | 0.8 | 1.6 | 24 | 0.05 | Do. |

¹ Figure indicates an average value determined by two or more independent determinations.

The effectiveness of the compositions of the present invention, the combination of trivalent arsenic compounds and thiourea compounds, is further substantiated by reference to the drawings, representing the data of Figures 1 and 2 in graphic form, wherein in Figure 1, smoothed curves are plotted which summarize the average corrosion rates obtained with various arsenious oxide and di-n-butyl thiourea combinations in a 24-hour period. The cross-hatched area of Figure 1 indicates those inhibitor combinations which permitted pitting over a 24-hour period. The synergistic action of the combination is seen from the fact that curves, A, B, C and D, are not straight lines. The straight broken lines, A', B', C' and D', illustrate the amount of inhibitors which would be required if the effect of the combined inhibitors were additive. An amount considerably less of a mixture of the two inhibitors is required to give a certain corrosion rate than if the effects of the two inhibitors were additive. This is shown by comparison of curves A, B, C and D with the corresponding straight broken lines A', B', C' and D', respectively. For example, the combination of 0.6 weight per cent of di-n-butyl thiourea and 0.32 weight per cent of arsenious oxide gives a corrosion rate of 1.0 I. P. Y. whereas if the effect were additive almost 0.45 weight per cent of arsenious oxide would be needed. It is seen from the curves A, B, C and D and lines A', B', C' and D' that the synergistic effect of the combination inhibitor becomes more noticeable as the corrosion inhibiting effect of the inhibitor increases.

The combined action of the arsenious oxide and di-n-butyl thiourea is illustrated more vividly in Figure 2, wherein weight loss is plotted against time for various inhibited acid solutions. Small percentages of arsenious oxide alone are seen to permit accelerated corrosion after a little over one day and 0.8 weight per cent of di-n-butyl thiourea alone is not very effective even at the start of the test. The combination of these two inhibitors, even in reduced concentrations, is effective over a period of days.

The inhibitor combinations of the present invention have been shown to effectively decrease the rate of corrosion of metal surfaces in contact with aqueous di-fluophosphoric acid at 185° F. The metal surfaces protected include steel and various ferrous alloys which are normally corroded by hydrofluoric acid producing or containing solutions. The degree of protection or length of time during which the corrosion rate is effectively reduced by any one inhibitor combination is dependent somewhat on the conditions of flow, temperature and acid concentration. A mixture of 50% fluophosphoric acid and 50% water is the most effective in acidizing siliceous formations and represents also the most corrosive acid concentration, especially when di-fluophosphoric acid is used. The inhibitor combinations of the present invention may be used at temperatures as high as 300° F. In a relatively static system, as in steel pipe and tubing, the length of time under which maximum protection is attained is greater than in a moving system as associated with pump parts and other close tolerance parts. Increase in velocity of flow of the acid solutions over the metal parts increases the rate of corrosion.

In introducing the treating solutions into the well bore the techniques of Carr described in United States Patents No. 1,891,667 and No. 2,018,199 may be employed. The treating solution is prepared by simultaneously introducing into the well tubing at the well head substantially equal weight proportions of water and the fluophosphoric acid, along with the inhibitor combinations or individual inhibitors of the present invention. An alternate procedure may be used whereby the desired amount of water is initially injected into the well followed by the proper amount of fluophosphoric acid, containing the inhibitors, to give the desired strength of acid. The mixture of acid and water takes place at the formation interface. Thus the heat of solution raises the formation temperature and increases the rate of reaction. If water is initially present in the earth bore, it must be substantially removed in order to avoid undue dilution of the fluophosphoric acid solution to a point where it is ineffective.

After injection of the acid solution into the formation, it is allowed to stand for several hours. Optimum times can be determined by appropriate field tests. Ordinarily due to existing formation temperatures and the exothermic nature of the hydrolysis reaction and the reaction of the acid with the formation, it is not necessary to preheat the formation prior to introduction of the acid. Although the corrosion inhibiting properties and advantages of the present compositions are evinced at ordinary temperatures, they become pronounced at elevated temperatures, as temperatures from about 150° F. to about 300° F. or higher. This is particularly important when it is considered that earth formation temperatures may run from 150° F. to 300° F. and it is sometimes practical to preheat a formation prior to acidization.

The proportions of ingredients of the hydrofluoric acid containing solutions of the invention are subject to some variation. Because arsenic compounds are extremely poisonous, 0.06 gram being near the fatal dose for an ordinary man, it is not desirable to use these compounds where it is possible that they may be assimilated by humans. In addition, the solubility of certain forms of arsenic compounds as arsenious oxide in aqueous solutions diminishes on standing and exposure to air converts the oxide to octahedral arsenic trioxide, which is much less soluble than the amorphous form. Also, the use of arsenious oxide alone in high concentrations necessary to get proper inhibition of corrosion has the additional deleterious effect of reducing the reactivity of the hydrofluoric acid containing solution toward silica. Consequently, the present invention has the additional advantage of allowing the use of lesser amounts of arsenious compounds, and thus eliminate the above disadvantages. In accordance with this invention, portions of the arsenic compound may be replaced by an alkyl thiourea and thereby obtain greater corrosion inhibition without the enumerated disadvantages.

In order to demonstrate that the inhibitor combination of the present invention is effective at elevated temperatures, a series of experiments were run in which mild steel samples were contacted for periods of 24 hours with 25 per cent di-fluophosphoric acid solutions at about 270° F. Under these conditions, one sample showed a corrosion rate of 0.14 I. P. Y. with no pitting, where 0.8 per cent arsenious oxide and 0.6 per cent of di-n-butyl thiourea were present. Under the same conditions with 0.8 per cent of arsenious oxide and 0.3 per cent of di-n-butyl thiourea, a corrosion rate of 1.83 I. P. Y. with pitting was found in another test. It is apparent from this that the inhibitors are effective at elevated temperatures.

The inhibitors of the present invention are applicable generally to ionized acid solutions containing hydrofluoric acid and specifically to aqueous solutions of fluophosphoric acids. The alkyl thiourea compounds may be of the symmetrical or unsymmetrical type. Di-n-butyl thiourea, di-ethyl thiourea, and di-phenyl thiourea are examples of symmetrical compounds. Butyl, ethyl, trimethyl, and ethyl phenyl thiourea are examples of unsymmetrical compounds. The alkyl group attached to the thiourea molecule may be either saturated or unsaturated and may contain any number of carbon atoms as long as the resulting compound is soluble in the acid solution to the extent of about 0.1 weight per cent. If the thiourea compound is less soluble than 0.1 weight per cent, then for all practical purposes it cannot be maintained in sufficient concentration to be an effective inhibitor. The same is true of the trivalent arsenic compounds which include arsenic halides as arsenic trichloride, alkali metal arsenites including sodium orthoarsenite and arsenious oxide, and excluding pentavalent arsenic compounds.

Thus, the invention contemplates the use of about 1.0 to 2.0 weight per cent of inhibitor comprising a combination of trivalent arsenic compound and an alkyl aryl or aryl, alkyl thiourea compound. The preferred ratio of ingredients is one wherein the trivalent arsenic compound is present in not greater amounts than the alkyl thiourea compound, although my invention contemplates the use of amounts of arsenic compounds as great as or greater than the amount of thiourea compound. Thus, the range of concentrations of the trivalent arsenic compound may be the equivalent of from below 0.5 weight per cent to 1 per cent of arsenic trioxide, while the thiourea compound is present in amounts equivalent to from 0.5 per cent to 1 per cent of n-dibutyl thiourea. I prefer not to use more than 1 per cent by weight of arsenious oxide or its equivalent because larger amounts noticeably reduce the activity of the acid without materially improving the inhibiting effect. Although larger amounts than 1 per cent of the thiourea compound do not appear to materially affect the activity of the acid, these compounds have limited solubility in the acid and do not materially improve the inhibitory action when present in quantities above 1 per cent. Inhibitor combinations of this invention having 1.4 total weight per cent of a trivalent arsenic compound and an alkyl thiourea compound have been found to be very effective in giving the desired degree of protection and freedom from pitting at both elevated temperatures and for extended periods of time, and thus represent preferred combinations. Combinations of inhibitors within this 1.4 total weight per cent limitation may contain 0.6 weight per cent of arsenic oxide or equivalent amount of other trivalent arsenic compound and 0.8 weight per cent of alkyl thiourea compound or 0.8 weight per cent of trivalent arsenic compound with 0.6 weight per cent of di-n-butyl thiourea or equivalent weight of other alkyl thiourea. According to the experiments herein, both of these compositions are very effective. However, the latter composition appears to exhibit a greater degree of protection over extended periods of time according to Figure 2.

Since it is desirable to utilize lesser amounts of arsenic compounds because of their deleterious effect on the action of the acid solution on sand, a composition comprising about 0.6 weight per cent of trivalent arsenic compound and 0.8 weight per cent of alkyl thiourea is contemplated.

The type of metal inhibited may be any ferrous alloy wherein the alloying constituent is present in the minor quantity and the iron portion is present in the major quantity of the total of the alloy composition. Although, as has been demonstrated, the inhibitor combination of the present invention exhibits the outstanding advantage of inhibiting the corrosive action of hydrofluoric acid containing solutions at elevated temperature, that is, from 185° F. to 300° F., this does not exclude their use or the possibility of their effectiveness at temperatures below 185° F. to as low as ambient temperature.

What is claimed is:

1. A composition of matter comprising an aqueous hydrofluoric acid-containing solution and a soluble corrosion inhibitor comprising between about 0.5 to 1.0 weight per cent of a trivalent arsenic compound and between about 0.5 to 1.0 weight per cent of a thiourea compound selected from the group consisting of alkyl, aryl and alkyl aryl thioureas.

2. A composition of matter in accordance with claim 1 in which the amount of trivalent arsenious compound is about 0.6 weight per cent and the amount of thiourea compound is about 0.8 weight per cent.

3. A composition of matter in accordance with claim 1 in which the trivalent arsenic compound is arsenious oxide.

4. A composition of matter in accordance with claim 1 in which the thiourea compound is di-n-butyl thiourea.

5. A composition of matter in accordance with claim 1 in which the thiourea compound is di-ethyl thiourea.

6. A composition of matter in accordance with claim 1 in which the aqueous hydrofluoric acid-containing solution is a fluophosphoric acid solution.

7. A composition of matter in accordance with claim 6 in which the corrosion inhibitor comprises the combination of a trivalent arsenic compound and a dialkyl thiourea.

8. A composition of matter in accordance with claim 7 in which the corrosion inhibitor comprises the combination of arsenious oxide and di-n-butyl thiourea.

9. A composition of matter in accordance with claim 7 in which the corrosion inhibitor comprises the combination of arsenious oxide and di-ethyl thiourea.

10. A composition of matter comprising an aqueous hydrofluoric acid-containing solution and about 1.4 weight per cent of a soluble corrosion inhibitor comprising about 0.6 weight per cent of arsenious oxide and about 0.8 weight per cent of di-n-butyl thiourea.

11. The method of inhibiting the corrosive action of hydrofluoric acid-containing solutions on ferrous metal surfaces comprising maintaining about 1.0 to 2.0 weight per cent of a soluble inhibitor in said acid-containing solution, said inhibitor comprising about 0.5 to 1.0 weight per cent of a trivalent arsenic compound and about 0.5 to 1.0 weight per cent of a thiourea compound selected from the group consisting of alkyl, aryl and alkyl aryl thioureas.

12. The method in accordance with claim 11 in which the trivalent arsenic compound is arsenious oxide.

13. The method in accordance with claim 11 in which the thiourea compound is di-n-butyl thiourea.

14. The method in accordance with claim 11 in which the thiourea compound is di-ethyl thiourea.

15. The method in accordance with claim 11 in which the hydrofluoric acid-containing solution is an aqueous fluophosphoric acid solution and the corrosion inhibitor comprises the combination of arsenious oxide and di-n-butyl thiourea.

16. The method in accordance with claim 15 in which the corrosion inhibitor comprises the combination of arsenious oxide and di-ethyl thiourea.

17. The method in accordance with claim 15 in which the fluophosphoric acid containing solution is a 50 per cent by weight aqueous solution.

18. The method of preventing the corrosion of ferrous metal parts during the acidization of a siliceous earth formation with a hydrofluoric acid-containing solution at a temperature between about 185° F. to about 300° F. comprising maintaining in said acid solution about 1.0 to 2.0 weight per cent of a soluble corrosion inhibitor comprising about 0.5 to 1.0 weight per cent of a trivalent arsenic compound and about 0.5 to 1.0 weight per cent of a thiourea selected from the group consisting of alkyl, aryl and alkyl aryl thioureas.

19. The method in accordance with claim 18 in which said hydrofluoric acid-containing solution is an aqueous solution of a fluophosphoric acid.

20. The method in accordance with claim 18 in which the trivalent arsenic compound is arsenious oxide and the thiourea is di-ethyl thiourea.

21. The method in accordance with claim 18 in which the thiourea compound is a dialkyl thiourea.

22. The method in accordance with claim 18 in which the trivalent arsenic compound is arsenious oxide and the alkyl thiourea is di-n-butyl thiourea.

23. The method in accordance with claim 18 in which the trivalent arsenic compound is arsenious oxide and the thiourea is di-n-butyl thiourea, said components being present in amounts of 0.6 and 0.8 weight per cent, respectively.

24. The method of increasing the inhibiting effect of trivalent arsenic compounds on the corrosive action of hydrofluoric acid-containing solutions on ferrous alloys which trivalent arsenic compounds are present in an amount of about 0.6 weight per cent in said solutions comprising maintaining at least about 0.8 weight per cent of a soluble alkyl thiourea compound in said acid containing solution.

25. The method of inhibiting the corrosive action of a fluophosphoric acid solution on ferrous metal surfaces in contact therewith at elevated temperature comprising maintaining about 0.6 weight per cent of arsenious oxide and about 0.8 weight per cent of di-n-butyl thiourea in said solution.

26. The method in accordance with claim 25 in which the elevated temperature is from about 185° F. to about 300° F.

References Cited in the file of this patent

UNITED STATES PATENTS

| Number | Name | Date |
| --- | --- | --- |
| 1,678,775 | Gravell | July 31, 1928 |
| 1,877,504 | Grebe et al. | Sept. 13, 1932 |
| 2,215,092 | Beekhuis et al. | Sept. 17, 1940 |
| 2,225,965 | Henderson et al. | Dec. 24, 1940 |
| 2,319,667 | Edmunds | May 18, 1943 |
| 2,602,779 | Moyer et al. | July 8, 1952 |
| 2,613,131 | Barnes et al. | Oct. 7, 1952 |